United States Patent Office 2,962,509
Patented Nov. 29, 1960

2,962,509

ETHINYLATION OF 17-KETOSTEROIDS

Gerhard Zuhlsdorff, Berlin-Frohnau, Germany, assignor to Firma Schering A.G., Berlin, Germany No Drawing. Filed Mar. 7, 1957, Ser. No. 644,481

Claims priority, application Germany Mar. 10, 1956

10 Claims. (Cl. 260—397.4)

The present invention relates to a new and improved method for the ethinylation of 17-ketosteroids and more particularly to an improved method of ethinylating 17 ketosteroids which contain at least one other free keto group somewhere in the molecule, for example in the 3-position.

Various methods for the ethinylation of a 17-keto group in steroids are known. The general problem in connection therewith is that where a final product is desired which contains a free keto group in some other portion of the molecule, for example in the 3-position, it was necessary prior to the present invention to first block this latter keto group, for example, by converting this keto group, which is to remain as such in the final compound, into an intermediate derivative from which the keto group can be easily regenerated before the ethinylation reaction in order to protect any undesired attack of the keto group by the ethinylating reagents.

Any reaction for the blocking of the keto group which is to remain within the final compound, for example the keto group in 3-position, can be utilized which at the same time in the presence of a keto group in 17-position permits blocking of only the other keto group, i.e. the 3-keto group, when the 17-keto group is the more reactive of the two. Among the suitable blocking methods are the reduction of the keto group to be protected to a secondary alcohol group, acetalation or enol-ether formation.

Only in exceptional cases, such as in the case of the extremely unreactive 11-keto groups is it possible to carry out the ethinylation of the 17-keto group without first protecting the other keto group.

It is therefore a primary object of the present invention to provide a method for the ethinylation of 17-ketosteroids without the necessity of first blocking other free keto groups in the molecule.

It is another object of the present invention to provide a method of directly ethinylating the 17-keto group of a 17-ketosteroid containing at least one other keto group which is in conjugation to at least one carbon-carbon double bond without the necessity of first blocking or protecting the other keto group.

Other objects and advantages of the present invention will be apparent from a further reading of the specification and of the appended claims.

With the above objects in view, the present invention mainly consists in a method of ethinylating 17-ketosteroids containing at least one other keto group in the molecule in conjugation to at least one carbon-carbon double bond, even in the case where such other keto group is not particularly unreactive, for example a keto group in 3-position, without first blocking or protecting the keto group or groups. The 17-ketosteroids can contain in addition to the other keto group or groups, other substituents such as free or acylated hydroxyl groups.

In accordance with the present invention, the 17-ketosteroids containing at least one other keto group in the molecule in conjugation to at least one carbon-carbon double bond is ethinylated by means of acetylene and an alkali metal such as potassium, lithium or sodium, preferably in a medium of liquid ammonia at a temperature of less than —40° C., and preferably less than —60° C. utilizing more than 2 mols of the alkali metal, most preferably potassium, per mol of the 17-ketosteroid.

According to a preferred embodiment of the present invention, the amount of alkali metal utilized is much more than 2 mols, and may be as much as 10 mols per mol of the 17-ketosteroid.

According to another embodiment of the present invention it is possible to utilize an alkali metal alcoholate, particularly an alkali metal alcoholate of a tertiary alcohol instead of the alkali metal itself. It is preferred according to this embodiment to utilize a potassium alcoholate of a tertiary alcohol, such as potassium tertiary butylate. Other suitable alcoholates include sodium tertiary butylate, lithium tertiary butylate, potassium tertiary amyl alcohol and other alkali metal tertiary aliphatic alcohols. It is further preferred according to this embodiment of the invention to utilize more than 2 mols of the alkali metal alcoholate per mol of the 17-ketosteroid.

The ethinylation at a temperature below —40° C. in liquid ammonium utilizing more than 2, and preferably as much as 10 mols of alkali metal per mol of the ketosteroid results in the reaction of only the one 17-keto group, in a convenient and surprising manner. Although the present invention is not meant to be limited as to any theory of operation thereof, it is believed that this proceeding results in the formation of metal enolates of the non-ethinylated keto groups.

The ethinylation by means of acetylene and an alkali metal alcoholate, preferably potassium tertiary butylate, and most preferably utilizing more than 2 mols of alkali metal alcoholate per mol of the ketosteroid, gives the same effect of direct ethinylation of the 17-keto group of a 17-ketosteroid without first protecting other keto groups of the same as with the use of acetylene and more than 2 mols of alkali metal at a temperature of less than —40° C.

Among the preferred starting materials for the present invention are 3,17-androstendione as well as the corresponding 19-nor-3,17-androstendione with at least one double bond in 4,5- or 1,2-position. These compounds can, if desired, have substituents in other positions in the molecule, such as in 11-position, particularly hydroxyl groups in free or esterified condition.

According to still another embodiment of the present invention, the ethinylation of 17-ketosteroids which contain at least one other keto group in the molecule in conjugation to at least one carbon-carbon double bond, for example a 3-position keto group in conjugation to a 4,5-position carbon-carbon double bond, and which may contain other further constituents, particularly free or acetylated hydroxyl groups, either by means of acetylene and more than 2 mols of an alkali metal per mol of ketosteroid, preferably in liquid ammonia at a temperature of below —40° C., or by means of acetylene and an alkali metal alcoholate such as potassium tertiary butylate is carried out in the presence of more than 2 mols of acetone per mol of ketosteroid in the reaction mixture. It has been found that the presence of more than 2 mols of acetone in the reaction mixture during the ethinylation greatly improves the yield.

The following examples are given as illustrative of the present invention, the invention not however being limited to the specific details of the examples.

EXAMPLE I

*Ethinylation of androst-4-en-3,17-dione*

200 cc. of ammonia are taken from a steel flask and condensed in a 3-tube one liter capacity round flask arranged in a Thermos vessel and cooled by means of acetone and solid carbon dioxide to a temperature of about −60° C. (The ammonia gas is passed through drying towers which are charged with soda-lime and potassium hydroxide.) A weak acetylene stream is passed into the condensed ammonia while simultaneously adding 4.9 g. of potassium in small portions, the same going into solution with a blue color. Thereafter the acetylene stream is increased. (The acetylene should preferably be passed over caustic potash rods to purify and dry the same.)

As soon as all of the potassium has been converted to the acetylide, a solution of 14.3 g. of androstendione in 100 cc. of benzene and 100 cc. of ether is added slowly to the obtained thin slurry over a period of several minutes while rotating the vessel, and subsequently rinsing with 20 cc. of benzol. The thus obtained reaction mass is then taken out of the cooling bath and remains standing until the following day.

The weakly colored reaction product is mixed with about 600 cc. of water. After standing for one hour, the benzene layer is siphoned off, washed with water until neutral and evaporated to dryness under vacuum. The residue is rubbed with methanol and is filtered off by suction leaving 0.21 g. of a solid, pure 17-ethinyl-testosterone having a melting point of 262–266° C. corresponding to 1.35% of the theoretical. The less pure major amount is precipitated from the filtrate with water, filtered off under suction and washed with water until neutral. This amounts to 14.81 g. having a melting point of 242–248° C., corresponding to a yield of the crude product of 94.9% of the theoretical. This product is purified by again rubbing with 100 cc. of methanol and filtered off by suction. This results in the obtention of 12.3 g. of a product having a melting point 255–264° C.

If this product is dissolved in 600 cc. of a 1:1 chloroform-methanol mixture at the boiling temperature and subsequently concentrated in vacuum at a temperature of not more than 30° C. to ⅕ the volume, there is obtained upon cooling a first crystal fraction consisting of 8.22 g. of pure ethinyltestosterone having a melting point of 265–267° C. This together with the 0.21 g. yield of pure product from the benzene solution gives a total yield of pure product of 54% of the theoretical. Upon further concentration there is obtained second and third crystal fractions totalling 2.55 g. and having a melting point of 255–260° C. Upon further purification of this in the last described manner, there is obtained a total yield of pure 17-ethinyltestosterone amounting to 65% of the theoretical.

EXAMPLE II

*Ethinylation of 19-nor-androst-4-en-3,17-dione*

A three-necked flask provided with an inlet tube, an outlet tube and a KPG-stirrer which is immersed in a mixture of carbon dioxide snow and acetone is charged with 150 cc. of dry, liquid ammonia. 10 g. of small pieces of potassium metal are introduced. The mass is stirred for a short time in order to bring as much potassium as possible into solution, and acetylene which has been dried (over potassium hydroxide and sodium wire) and purified (over "Heratol") is introduced into the deep blue solution until a quantitative conversion of the potassium metal to potassium acetylide has occurred, which is apparent by a complete decoloration of the solution. To the thus obtained slurry there is slowly added dropwise under vigorous stirring, or still better under thorough shaking, at a temperature of −60 to −70° C. a solution of 12.3 g. of 19-nor-androst-4-en-3-17-dione in 75 cc. of absolute ether and 75 cc. of absolute benzene. Subsequently, additional acetylene is passed through the reaction mass at the same temperature during an additional three hours. The reaction vessel is then taken from the cooling bath and allowed to stand for 20 hours at room temperature whereby the ammonia is evaporated.

The evaporation residue is worked up by dilution with one-half liter of water. The undissolved residue is separated by filtering off under suction. The filtrate is shaken several times with benzene. The purified benzene extract is washed with water and dried over sodium sulphate. Upon distilling off the benzene under reduced pressure an oily residue is obtained which, by the addition of several drops of methanol is crystallized. The undissolved residue (4 g. having a melting point of 180–192° C.) and the residue from the benzene (8.5 g. having a melting point of 174–186° C.) give together a yield of 12.5 g.=92.6% of the theoretical of crude 19-nor-17-ethinyl-androst-en-17-ol-3-one.

This is purified by recrystallization from methanol whereby the major portion immediately precipitates as the pure final product having a melting point of 199–202° C. and specific rotation $[\alpha]_D = -23.5°$ (in chloroform). The portion remaining in the mother liquor is, by chromatography over 50 times the amount by weight of aluminum oxide according to Woelm (quality "acid" with 1% water content), obtained in pure condition. For this purpose a dilute solution of the mother liquor containing the product in a mixture of methylene chloride and carbon tetrachloride in a ratio of 2:1 is poured into an aluminum oxide column and eluated with the same solvent mixture, whereby the impurities remain in the column.

EXAMPLE III

*Ethinylation of $\Delta^{4,6}$-androstadiene-3,17-dione*

100 cc. of ammonia is condensed in the same apparatus as in Example II. 7.6 g. of potassium is introduced in portions while passing a weak acetylene stream through the liquid ammonia. After the greatest portion of the potassium has gone into solution, the acetylene stream is increased until all of the potassium has been converted into the acetylide. Thereafter 5 cc. of acetone is added while shaking. A solution of 14.2 g. of $\Delta^{4,6}$-androstadienedione having a melting point of 167–168° C. in 100 cc. of benzene and 100 cc. of ether is then added during a period of 1–2 minutes, and subsequently rinsed with 20 cc. of benzene. The reaction mixture is allowed to stand for an additional 18 hours at +10° C., whereby the reaction mixture becomes an orange-red color. 800 cc. of water are then added. After standing for 1 hour the benzene layer is siphoned-off, washed until neutral and evaporated leaving a residue of 2.09 g. This is stirred with methanol and filtered off by suction leaving a residue of 1.07 g. of 17-ethinyl-$\Delta^6$-dihydrotestosterone having a melting point of 256–260° C., corresponding to 6.5% of the theoretical. The major amount of the substance which has precipitated from the water is filtered off by suction, washed with water until neutral and thereafter washed with 140 cc. of methanol. After drying, 11.69 g. of a product melting at 248–253° C. is obtained. Both crystal fractions are recrystallized together from chloroform-methanol (1:1) and result in 11.53 g. of a product melting at 260–262° C.;

$$[\alpha]_D = -100.6°$$

(in pyridine); yield: 75.1% of the theoretical. An additional 2–3% can be isolated without further treatment from the mother liquor.

EXAMPLE IV

*Ethinylation of $\Delta^{4,6}$-androstadiene-3,17-dione*

230 cc. of ammonia are condensed in the same apparatus as in Example II. By passing through a weak stream of acetylene, 4.9 g. potassium is converted by the acetylene to potassium acetylide. A solution of 14.2 g. of $\Delta^{4,6}$-androstadienedione (melting point=167–168° C.) in 100 cc. of benzene and 100 cc. of ether is then added and rinsed down with 20 cc. of benzene-ether (1:1).

The reaction mass is allowed to stand for 20 hours and then 800 cc. of water is added thereto. The benzene layer is siphoned off, washed to neutral and evaporated. 5.15 g. of a foamy material is obtained. The same is rubbed with methanol and 1.03 g. of 17-ethinyl-Δ⁶-dihydrotestosterone having a melting point of 250–255° C. is obtained therefrom. The major amount of the substance is obtained from the aqueous portion by suction filtration, and washing with water and then with methanol. This amounts to 7.02 g. with a melting point of 251–255° C. Both portions are recrystallized together from chloroform-methanol (1:1) and 7.08 g. of 17-ethinyl-Δ⁶-dihydrotesterone having a melting point of 259–261° C. is obtained. Yield: 45.7% of the theoretical. $[\alpha]_D = -100.2°$ in pyridine.

EXAMPLE V

A solution of 10 g. of nor-androstenedione in 100 c. of toluene is added during 2 minutes while stirring in a nitrogen stream to a potassium tertiary butylate solution produced from 10 g. of potassium and 140 cc. of tertiary butyl alcohol. After about 30 minutes, a homogeneous brown solution is obtained. Thereafter, acetylene is passed over the solution while stirring for 15½ hours.

The reaction solution is acidified with dilute hydrochloric acid to a strong acid reaction with Congo paper and the substance is extracted with toluene. The neutral washed toluene solution is, after drying with sodium sulphate, concentrated under vacuum to about 150 cc. and filtered over an aluminum oxide column.

By concentrating the toluene solution, 7.33 g. of 17-ethinyl-19-nortestosterone having a melting point of 184/194–199° C. is obtained. Recrystallization from methanol gives the pure substance having a melting point of 199–202° C.

EXAMPLE VI

17-ethinyltestosterone 100 cc. of ammonia is taken from a steel flask and condensed in a 3-tube one liter capacity round flask arranged in a Thermos vessel and cooled by means of acetone and solid carbon dioxide to a temperature of about —70° C. The ammonia gas is passed through drying towers which are charged with soda-lime and potassium hydroxide. A weak acetylene stream is passed into the condensed ammonia while simultaneously slowly adding 7.6 g. of potassium in small portions, the same going into solution of a blue color. The acetylene stream is then increased in strength. (The acetylene should preferably be passed over caustic potash rods to purify and dry the same.)

As soon as all of the potassium has been converted to the acetylide, there is added to the obtained thin slurry, while rotating the vessel, first 5 cc. of acetone and then during about 1½ minutes a solution of 14.3 g. of Δ⁴-androstenedione (melting point=169–171° C.) in 100 cc. of benzene and 100 cc. of ether, and subsequently rinsing with 20 cc. of benzene. The thus obtained reaction mass is then taken out of the cooling bath and allowed to stand for about 18 hours at a temperature of about +10° C.

The weakly coated reaction product is mixed with about 800 cc. of water. After standing for 1 hour the benzene layer is separated, washed with water until neutral and evaporated to dryness under vacuum. The residue (0.58 g.) is rubbed with methanol and filtered off by suction. There is thus obtained 0.27 g. of a 17-ethinyltestosterone having a melting point of 253/258–264° C., corresponding to 1.73% of the theoretical.

The major amount of the substance is obtained from the aqueous layer by suction filtration. This is washed with water until neutral and subsequently washed with 160 cc. of methanol. After drying, 13.86 g. of the substance having a melting point of (250/253) 254–258° C., corresponding to 88.8% of the theoretical.

By crystallization from chloroform-methanol (1:1) 12.85 g. of the substance melting at 263/264/265–267° C. corresponding to 82.4% of the theoretical is obtained. (The pure substance melts at 266–268° C.) From the benzene layer and from the mother liquor an additional 0.476 g. having a melting point of 258/260–264° C., corresponding to 3.05% of the theoretical, can be isolated.

EXAMPLE VII

This example is carried out exactly the same as Example I, however substituting 2.8 g. of sodium for the 4.9 g. of potassium of Example I. The results obtained are substantially the same as in Example I, the total yield of pure 17-ethinyltestosterone amounting to about 63% of the theoretical.

EXAMPLE VIII

This example is carried out exactly the same as Example V however utilizing sodium tertiary butylate solution which is produced from 6 g. of sodium and 140 cc. of tertiary butyl alcohol. The results obtained are substantially the same as in Example V.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be secured by Letters Patent is:

1. In a method of ethinylating a 17-ketosteroid containing at least one other keto group in the molecule in unblocked condition and being in conjugation to at least one carbon-carbon double bond and being selected from the group consisting of androst-4-en-3,17-dione, 19-nor-androst-4-en-3,17-dione and Δ⁴,⁶-androstadiene-3,17-dione, the step of treating said 17-ketosteroid with acetylene at a temperature of below —40° C. and in the presence of more than 2 mols of an alkali metal per mol of said 17-ketosteroid so as to directly ethinylate said 17-keto group without attacking said other unblocked keto group in the molecule.

2. In a method of ethinylating androst-4-en-3,17-dione, the step of treating said androst-4-en-3,17-dione with acetylene at a temperature of below —40° C. and in the presence of more than 2 mols of an alkali metal per mol of said androst-4-en-3,17-dione so as to directly ethinylate the 17-keto group without attacking 3-keto group in the molecule.

3. In a method of ethinylating 19-nor-androst-4-en-3,17-dione, the step of treating said 19-nor-androst-4-en-3,17-dione with acetylene at a temperature of below —40° C. and in the presence of more than 2 mols of an alkali metal per mol of said 19-nor-androst-4-en-3,17-dione so as to directly ethinylate the 17-keto group without attacking 3-keto group in the molecule.

4. In a method of ethinylating Δ⁴,⁶-androstadiene-3,17-dione, the step of treating said Δ⁴,⁶-androstadiene-3,17-dione with acetylene at a temperature of below —40° C., in the presence of more than 2 mols of an alkali metal per mol of said Δ⁴,⁶-androstadiene-3,17-dione so as to directly ethinylate the 17-keto group without attacking said 3-keto group in the molecule.

5. In a method of ethinylating a 17-ketosteroid containing at least one other keto group in the molecule in unblocked condition and being in conjugation to at least one carbon-carbon double bond and being selected from the group consisting of androst-4-en-3,17-dione, 19-nor-androst-4-en-3,17-dione and Δ⁴,⁶-androstadiene-3,17-dione, the step of treating said 17-ketosteroid with acetylene at a temperature of below —40° C., in the presence of more than 2 mols of an alkali metal per mol of said 17-ketosteroid and in the further presence of more than 2 mols of acetone per mol of said 17-ketosteroid so as to directly ethinylate the 17-keto group without attacking 3-keto group in the molecule.

6. In a method of ethinylating a 17-ketosteroid containing at least one other keto group in the molecule in unblocked condition and being in conjugation to at least one carbon-carbon double bond and being selected from the group consisting of androst-4-en-3,17-dione, 19-nor-androst-4-en-3,17-dione and $\Delta^{4,6}$-androstadiene-3,17-dione, the step of treating said 17-ketosteroid at a temperature below —40° C. with acetylene in the presence of more than 2 mols of an alkali metal alcoholate per each mol of said 17-ketosteroid so as to directly ethinylate said 17-keto group without attacking said other unblocked keto group in the molecule.

7. In a method of ethinylating a 17-ketosteroid containing at least one other keto group in the molecule in unblocked condition and being in conjugation to at least one carbon-carbon double bond and being selected from the group consisting of androst-4-en-3,17-dione, 19-nor-androst-4-en-3,17-dione and $\Delta^{4,6}$-androstadiene-3,17-dione, the step of treating said 17-ketosteroid with acetylene at a temperature below —40° C. in the presence of more than 2 mols of an alkali metal alcoholate of a tertiary alcohol per each mol of said 17-ketosteroid so as to directly ethinylate said 17-keto group without attacking said other unblocked keto group in the molecule.

8. In a method of ethinylating a 17-ketosteroid containing at least one other keto group in the molecule in unblocked condition and being in conjugation to at least one carbon-carbon double bond and being selected from the group consisting of androst-4-en-3,17-dione, 19-nor-androst-4-en-3,17-dione and $\Delta^{4,6}$-androstadiene-3,17-dione, the step of treating said 17-ketosteroid with acetylene at a temperature below —40° C. in the presence of more than 2 mols of potassium tertiary butylate per each mol of said 17-ketosteroid so as to directly ethinylate said 17-keto group without attacking said other unblocked keto group in the molecule.

9. In a method of ethinylating a 17-ketosteroid containing at least one other keto group in the molecule in unblocked condition and being in conjugation to at least one carbon-carbon double bond and being selected from the group consisting of androst-4-en-3,17-dione, 19-nor-androst-4-en-3,17-dione and $\Delta^{4,6}$-androstadiene-3,17-dione, the step of treating said 17-ketosteroid with acetylene at a temperature below —40° C. in the presence of more than 2 mols of an alkali metal alcoholate of a tertiary alcohol per each mol of said 17-ketosteroid and in the further presence of more than 2 mols of acetone per mol of 17-ketosteroid so as to directly ethinylate said 17-keto group without attacking said other unblocked keto group in the molecule.

10. In a method of ethinylating a 17-ketosteroid containing at least one other keto group in the molecule in unblocked condition and being in conjugation to at least one carbon-carbon double bond and being selected from the group consisting of androst-4-en-3,17-dione, 19-nor-androst-4-en-3,17-dione and $\Delta^{4,6}$-androstadiene-3,17-dione, the step of treating said 17-ketosteroid with acetylene in the presence of more than 2 mols of alkali metal alcoholate per each mol of said 17-ketosteroid and in the further presence of more than 2 mols of acetone per mol of 17-ketosteroid at a temperature of from —70° C. to room temperature so as to directly ethinylate said 17-keto group without attacking said other unblocked keto group in the molecule.

References Cited in the file of this patent

UNITED STATES PATENTS

| | | |
|---|---|---|
| 2,713,062 | Junkman et al. | July 12, 1955 |
| 2,888,471 | Sondheimer et al. | May 26, 1959 |